F. M. FURBER.
GRINDING MACHINE.
APPLICATION FILED MAY 13, 1913.
1,127,877.
Patented Feb. 9, 1915.
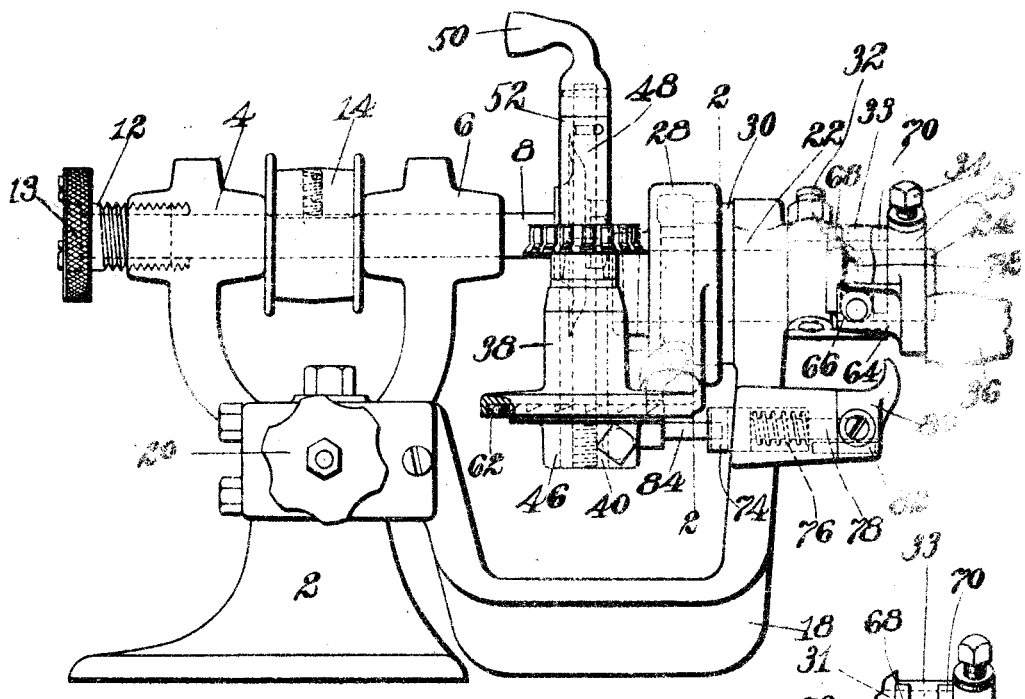
Fig. 1.
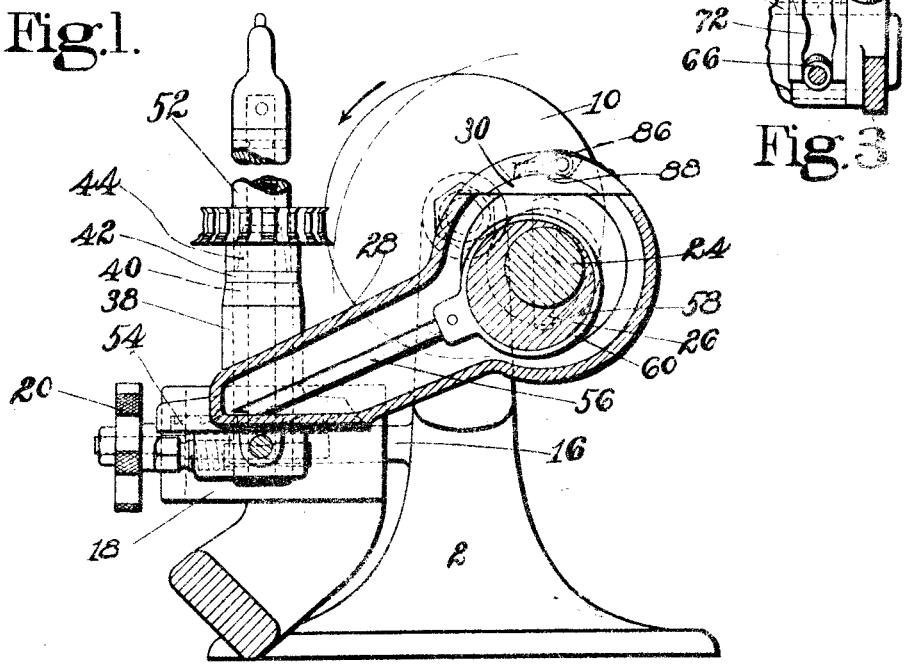
Fig. 2.
Fig. 3.
WITNESSES
Elizabeth C. Coyle
O. Blanche Hargraves
INVENTOR
Frederick M. Furber
By his Attorney
Nelson M. Howard

UNITED STATES PATENT OFFICE.

FREDERICK M. FURBER, OF REVERE, MASSACHUSETTS, ASSIGNOR TO UNITED SHOE MACHINERY COMPANY, OF PATERSON, NEW JERSEY, A CORPORATION OF NEW JERSEY.

GRINDING-MACHINE.

1,127,877.  Specification of Letters Patent.  Patented Feb. 9, 1915.

Application filed May 13, 1913. Serial No. 767,323.

*To all whom it may concern:*

Be it known that I, FREDERICK M. FURBER, a citizen of the United States, residing at Revere, in the county of Suffolk and State of Massachusetts, have invented certain Improvements in Grinding-Machines, of which the following description, in connection with the accompanying drawings, is a specification, like reference characters on the drawings indicating like parts in the several figures.

This invention relates to grinding machines and particularly to machines for grinding the teeth of rotary cutters such as are used for trimming the edges of soles in the manufacture of boots and shoes. Cutters used for this and similar purposes are circular in peripheral outline, and include a plurality of evenly spaced teeth the ends of which are formed to present cutting edges that correspond to the desired transverse contour of the edge of the work, and each tooth is backed off at a slight angle to the direction of its motion in order to give the clearance necessary to enable the tooth to cut. If in sharpening these cutters, the faces of some of the teeth are ground to a greater extent than others, it is obvious that the diametrical length of the teeth will be caused to vary correspondingly and the true periphery of the cutter will not be maintained. Such variation frequently occurs in practice, especially where the cutter is presented by hand to the grinding member, and cutters thus incorrectly ground tend to vibrate when in contact with the work, and do not produce smooth edges. The general object of this invention is to avoid such inaccuracy in the grinding of these cutters and to produce a machine that will serve to grind all the teeth of the cutter to a uniform extent and maintain the teeth in correctly spaced relation, and one, moreover, that will perform the grinding operation in a rapid and effective manner.

With this end in view I have devised a machine that includes, broadly, a grinding member and a member for supporting a cutter, with a novel arrangement for effecting relative movement of said members to cause alternate engagement and disengagement of the grinding member and cutter. In the preferred arrangement the cutter is carried bodily around the grinding member in a closed circular path and into and out of contact therewith, and novel means are provided to advance the cutter angularly to bring successive teeth into position to be ground when the cutter is out of contact with the grinding member. The arrangement also includes means to vary the path of relative traverse of the cutter and grinding member so as to adjust the machine to operate upon cutters of different diameters or teeth of different radial depths.

Another feature of the invention, as embodied in a machine having provision for relative movement of the cutter supporting member and grinding member to bring the active face of the latter and the surface to be ground into opposed relation, consists of means for confining such relative movement to a predetermined path, with provision also preferably for other relative movement of these members to bring the grinding member and the surface to be ground into the desired effective relation. The preferred construction embodies guiding means for directing the movement of the cutter so as to prevent contact of the cutting edges of the teeth with the periphery of the grinding wheel and to bring the surface of a tooth to be ground initially into opposed relation to the active face of the wheel without making firm contact therewith, and provision for subsequently moving the cutter to effect firm engagement of the grinding member and the surface to be ground, and for finally withdrawing the tooth from such firm engagement before the cutter has completed its traverse of the wheel.

A further feature of the invention resides in novel means for warning the operator when the last tooth of the series has been ground, and preventing further operation of the machine without special attention on the part of the operator, thereby preventing a tooth from being ground a second time and assuring that all the teeth shall be ground to a uniform extent.

A still further feature consists in the provision of means whereby the operator is enabled to bring the cutter support to rest with the cutter in operative relation to the grinding member and then move the cutter manually upon its support to grind one or more of the teeth to any extent desired, such means being especialy useful where it is necessary to true the cutter.

These and other features of the invention, including certain details of construction and combinations of parts, will be described with reference to an illustrative machine and pointed out in the appended claims.

Referring now to the accompanying drawings, which illustrate a machine that constitutes a preferred embodiment of the invention, Figure 1 is a front elevation of the machine, Fig. 2 is an end elevation showing portions of the machine in section on the line 2—2 of Fig. 1, and Fig. 3 is a detail view illustrating a portion of the means for effecting one of the bodily movements of the cutter.

The standard 2 of the machine has bearings 4 and 6 for a rotary shaft 8 upon one end of which is secured a grinding wheel 10. The grinding wheel is formed to present at portions adjacent to its periphery on the side next to the bearing 6 a plane face upon which to grind the teeth of the cutter. Into the rear end of the bearing 4 is adjustably threaded a bushing 12 which forms an extension of the shaft bearing and is provided with a recess in which rotates a diametrically enlarged end-portion 13 of the shaft 8. With this construction the shaft may rotate in the bushing member, but on adjustment of the latter will be moved longitudinally in one direction or the other, so as to vary the position of the grinding wheel with reference to the cutter for a purpose to be subsequently explained. The pulley 14 by which the shaft is driven in the direction indicated by the arrow on Fig. 2 is mounted in such manner as to permit free longitudinal movement of the shaft therethrough.

The standard 2 has projecting therefrom a bracket 16 upon which is mounted to slide horizontally a frame 18 which serves to support the mechanism for presenting the cutter to the action of the grinding wheel. A screw 20 is adjustably threaded in the end of the bracket 16, and a portion of the frame 18 is held in swiveled relation on a reduced portion of the shank of the screw, as shown by dotted lines in Fig. 2, so that the frame partakes of the longitudinal movement of the screw and slides over the bracket 16 in one direction or the other when the screw is turned, this mechanism serving to vary the path of movement of the cutter with reference to the grinding member as will be hereinafter pointed out.

The portion 22 of the frame 18 serves to provide an extended bearing for a rotary shaft 24, and upon one end of this shaft is secured, by means of a pin 26, a hollow arm or casing 28 which is mounted at one side rotatably upon a boss 30, the latter projecting from the frame and forming one extension of the shaft bearing. On the opposite side of the frame member is a bearing extension 31 upon which is clamped by means of a bolt 32 a sleeve 33. Upon the forward end of the shaft adjacent to this sleeve is secured in adjusted position by means of a set screw 34 a crank 35 which is provided with a handle 36.

The arm 28 carries at its outer end a cutter support which comprises a bearing member 38 and a spindle 40 mounted rotatably therein. The spindle is provided with a collar 42 that rests upon the upper end of the bearing member 38, and is provided also at its upper end with a conical seat portion 44. The spindle has secured upon its lower end a sleeve 46 which serves to retain the spindle in the bearing member. Formed centrally of the spindle is an opening provided with a threaded portion at its lower end and adapted to receive a removable rod 48 which has a correspondingly threaded end portion. This rod is provided with a handle 50, and embracing the rod in permanently swiveled relation thereto, as shown, is a sleeve 52 which is split longitudinally at its lower end and is shaped to fit upon the conical portion 44 of the spindle. In the use of this device the rod is inserted within the opening in the spindle and a cutter to be ground is passed over the handle portion 50 and the sleeve 52 until it rests upon the collar 42. By turning the handle 50 the rod may then be advanced longitudinally within the spindle and the lower portion of the sleeve 52 expanded by movement over the conical member 44 so as to hold the cutter firmly in the desired position.

It will be seen that the shaft 24 is positioned at one side of the center of the grinding wheel and consequently on a rotation of the shaft, which takes place in a direction opposite to that indicated by the arrow applied to the wheel, the cutter support and the cutter will be revolved bodily about the grinding wheel in a direction opposite to the direction of rotation of the latter and in a path that traverses the wheel during a portion of the revolution of the cutter, as represented by dotted lines in Fig. 2. The cutter, as shown, is mounted upon the support in a plane transverse to the direction of movement of the support, and the grinding wheel projects into the path of movement of the cutter a distance substantially equal to the radial depth of the teeth of the cutter. In order to advance the cutter and bring the teeth successively into position to be ground, I have provided means which includes a wheel 54, preferably formed integral with the sleeve 46 and therefore rotatable with the spindle 40 and provided upon its upper side with teeth corresponding in number to the teeth on the cutter to be ground, and a pawl 56 which is advanced once on every revolution of the cutter support and by engagement with the teeth on the wheel 54 serves to advance the spindle and cutter the necessary distance to bring succeeding teeth into position to be ground. The means for operating the pawl comprises a stationary eccentric 58 formed on one side of the boss 30 and a strap 60 which is secured to the pawl and embraces the eccentric. The pawl may be held in position to engage the teeth of the wheel 54 by any suitable means. In the preferred construction shown the pawl is magnetized so as to maintain its position in contact with the wheel 54, while friction of the strap 60 upon the eccentric during the rotation of the shaft 24 contributes to the same result.

The position of the eccentric is such that the cutter will be advanced when it is out of contact with the grinding member, the advancing movement terminating shortly before the cutter arrives at the position shown in Fig. 2. In order to prevent the cutter and its supporting spindle from rotating backwardly in the bearing 38 any suitable means may be provided, such means in the preferred construction shown comprising a Horton clutch represented at 62 and including a roller that operates upon the periphery of the wheel 54 to prevent backward rotation thereof.

It will be seen that the mechanism for advancing the cutter angularly is inclosed within the hollow arm 28 and a portion of the member 38 which projects as a casing over the wheel 54. Such a construction, especially in view of the direction of rotation of the cutter support in relation to the grinding wheel, serves to protect the operative mechanism effectively from the dust that is caused by the grinding operation, which is of special importance in this class of machines, since the emery dust would be ruinous if permitted to work into the bearings.

In order to assure that the teeth shall be brought into firm contact with the grinding wheel so as to grind them to the extent desired, and at the same time to prevent the cutting edges from being roughened when the teeth make or break engagement with the wheel, I have provided further means for directing the movement of the cutter in a predetermined path and for imparting during a certain portion of the cycle of operations bodily movement to the cutter in a direction transverse to the general plane of its movement around the wheel. With this end in view, the shaft 24 is mounted so as to have a slight longitudinal movement in its bearings, and the arm 28 and the cutter support are consequently movable to the same extent in directions transverse to the plane of the grinding wheel. Upon the rear of the crank 35 is a projection 64 which carries a roller 66, and upon the periphery of the sleeve 33 are formed a pair of guide members 68 and 70 which are spaced to receive the roller closely therebetween. These members are shaped at their end portions to maintain the roller in a normal plane of revolution about the axis of the shaft 24, and are formed to present an intermediate curved guideway 72 that serves to effect a movement of the roller and shaft 24 longitudinally of the axis of the latter alternately toward the right and the left as the machine is viewed in Fig. 1. The guides are of such length and the crank 35 is adjusted upon the shaft in such relation to the cutter support that the roller will enter the straight portion of the guideway immediately before the cutter arrives at the position represented in the drawings, in its path of movement about the wheel, or prior to the time of possible contact of the edges of the teeth with the grinder. The cutter will preferably be so mounted upon its support that when the roller is between the plane faces of the guide members the face of the tooth to be ground shall be lightly in contact with the face of the wheel. When the cutter, continuing its movement, arrives at a point where substantially the entire surface to be ground is in opposed relation to the face of the grinding member, the roller reaches the curved portion 72 of the guideway and the cutter is moved bodily to bring the face of the tooth into firm engagement with the wheel so as to grind it to the extent desired, without disturbing in any manner the predetermined angular relation of the tooth to the face of the wheel, or the substantially parallel relation of the face of the wheel and the surface to be ground. Further movement serves to disengage the tooth from firm contact with the grinding member, this occurring before the cutter has receded radially from the wheel to any great extent; and the roller finally leaves the plane portion at the other end of the guideway when the peripheral line of the cutter has fully cleared the grinding member. It will be evident that with this construction the faces of all the teeth will be fully ground to a uniform extent at the same angle in relation to the axis of the cutter, and that there will be no tendency to grind some portions of the surface more than others and consequently to round or change the angle of the surface, nor any liability of bringing the cutting edge of a tooth into contact with the peripheral surface of the wheel. It is conceivable that the plane portions of the guides might be dispensed with, since the operator, as he stands in front of the machine with reference to the position shown in Fig. 1, would naturally tend to maintain the shaft 24 at the limit of its movement toward the left; but it is preferable to construct the guides as shown so as to make sure that the grinding operation shall always be effected in the manner intended.

In order to warn the operator when all the teeth have been ground and to prevent grinding a tooth a second time, I have provided mechanism which includes a stop member 74 slidable in a socket in the frame and urged toward the path of movement of the cutter support by a spring 76, the stop member having a rod 78 projecting through the frame with a head 80 secured thereon which serves to limit the movement of the stop in the direction mentioned and is shaped to provide a lug by which the operator may move the stop in the opposite direction. A pin 82 prevents rotation of the stop member in its socket. The end of the stop 74 is provided with a slot, indicated by dotted lines in Fig. 1, and at the rear of the slot, as viewed in this figure, the stop is slightly cut away at the end and is beveled. Carried by the sleeve 46 is a pin 84 which, at a certain point in the rotation of the cutter-carrying spindle consequent upon the revolution of the support, contacts with the beveled portion of the end of the stop 74 and pressing the latter backward slightly in the socket snaps into the slot in the end of the stop member. This serves to lock the cutter support securely in stationary position, as shown in the drawings, whence it cannot be moved in either direction until released through retraction of the stop by means of the lug on the member 80.

The general features of operation of the mechanism thus far described have already been indicated. To grind a cutter, the operator first brings the support into the locked position represented in the drawings. The sleeve 52 having been loosened on the conical seat 44, a cutter is passed over the handle 50 and the sleeve until it rests upon the collar 42. The operator then turns the cutter until the face of one of its teeth contacts lightly with the grinding face of the wheel 10, adjusting, if necessary, the grinder shaft lengthwise in its bearings by means of the screw 12 so that the wheel may be in proper position to grind the teeth at the required angle, and then by turning the handle 50 he forces the sleeve 52 downward so as to expand its lower portion and hold the cutter securely in place. Since the sleeve and the rod 46 are relatively rotatable, the rod will be turned within the sleeve and the latter will be held from turning by friction upon its seat, thereby avoiding any tendency to turn the cutter from the desired position of adjustment.

The cutter having been secured in position as described, and the screw 20 manipulated, if necessary, to properly space the cutter with reference to the periphery of the grinding wheel, the operator retracts the stop 74 from contact with the pin 84 and turns the shaft 24 by means of the handle 36 so as to revolve the support and cutter about the grinding wheel in a direction opposite to the direction of rotation of the latter, the mechanism operating to grind the teeth successively in the manner pointed out in the preceding description. When the last tooth of the series has been ground the pin 84 will engage the stop 74 and lock the parts again in stationary position. If desired, the grinding wheel and cutter may then be readjusted and the machine operated to grind the cutter a second time.

It is sometimes desirable to grind some of the teeth of a cutter to a greater extent than others, particularly where it is necessary to true the cutter. To enable the operator to accomplish this readily, I have provided means for maintaining the cutter support at rest with the cutter in position to make full contact with the grinding member. This means comprises a pawl 86 carried by the casing 28 and a notch formed in the boss 30 in the plane of movement of the pawl so as to provide an abutment 88 with which the pawl will engage when the cutter is at about the middle point of its traverse of the grinding wheel, the weight of the parts tending to rotate the arm backwardly and keep the pawl in engagement with the abutment. By turning the handle 50 the cutter may then be released, and the operator may manipulate the cutter upon the sleeve in a well known manner so as to grind any of the teeth to the extent desired.

Although I have disclosed the invention as embodied in a machine having the specific features of construction shown and described, it should be understood that the invention is not thus restricted in its application but that various other embodiments are comprehended within the spirit and scope thereof.

Having described the invention, what I claim as new and desire to secure by Letters Patent of the United States is the following:—

1. A machine of the class described having, in combination, a grinding member, a member for supporting a cutter, and means whereby to move one of said members bodily in a closed path around the other member and closely adjacent to said other member during a portion of said movement to effect alternate engagement and disengagement of the grinding member and the cutter.

2. A machine of the class described having, in combination, a grinding member, a member for supporting a cutter, and means whereby to revolve one of said members bodily around the other in a circular path eccentric to said other member to effect alternate engagement and disengagement of the grinding member and the cutter.

3. A machine of the class described having, in combination, a support for a cutter, means whereby to revolve said support so as to move the cutter continuously in one direction in a closed path, and a grinding member projecting into the path of movement of the cutter.

4. A machine of the class described having, in combination, a grinding member, means whereby to rotate said member continuously in one direction, and a support for a cutter, said support being movable to carry the cutter continuously around the grinding member in a direction opposite to the direction of rotation of said member and into and out of contact therewith.

5. A machine of the class described having, in combination, a grinding member, a support for a cutter, said support being mounted to revolve in a closed path around the said grinding member so as to carry the cutter into and out of contact with said member, and means for varying the position of the axis of revolution of said support with reference to said grinding member.

6. A machine of the class described having, in combination, a grinding wheel, and means for carrying a cutter in a closed path around said wheel and into and out of contact therewith, said means comprising an arm rotatable about an axis substantially parallel to the axis of said wheel and intersecting said wheel within the periphery thereof and a spindle carried by said arm and arranged to support the cutter across the plane of the grinding wheel.

7. A machine of the class described having, in combination, a grinding member, means for carrying a toothed cutter bodily around said member and into and out of contact therewith, and means for effecting angular movement of said cutter when out of contact with said grinding member to bring successive teeth into position to be ground.

8. A machine of the class described having, in combination, a grinding member, a support for a cutter, said support being movable to carry the cutter bodily around the grinding member and into and out of contact therewith and including a rotatable spindle upon which the cutter is mounted, means for rotating said spindle to advance the cutter when the latter is out of contact with the grinding member, and means for shielding said spindle and its rotating means from the dust of the grinding operation.

9. A machine of the class described having, in combination, a grinding member, a hollow arm rotatably mounted at one side of said member, said arm carrying a casing at the outer end thereof and a rotatable spindle mounted in said casing, said spindle having means for supporting a cutter to carry it into and out of contact with said grinding member on a rotation of said arm, and mechanism for rotating said spindle to advance the cutter when the latter is out of contact with the grinding member, said mechanism being arranged within said hollow arm and casing and shielded thereby from the dust of the grinding operation.

10. A machine of the class described having, in combination, a grinding member, an arm rotatably mounted at one side of said member, a rotatable spindle mounted on said arm, said spindle having means for supporting a cutter to carry it into and out of contact with said grinding member on a rotation of said arm, and a pawl and ratchet device operative on a movement of said arm to rotate said spindle when the cutter is out of contact with the grinding member so as to bring the teeth of the cutter successively into position to be ground.

11. A machine of the class described having, in combination, a grinding member, an arm rotatably mounted at one side of said member, a rotatable spindle mounted on said arm, said spindle having means for supporting a cutter to carry it into and out of contact with said grinding member on a rotation of said arm, a ratchet wheel carried by said spindle, a stationary eccentric, and means operated by said eccentric on a movement of said arm to engage and rotate said ratchet wheel when the cutter is out of contact with the grinding member.

12. A machine of the class described having, in combination, a grinding member, a support for a toothed cutter, said support being mounted for revoluble movement to carry the cutter in one direction around said grinding member and into and out of contact therewith and including a rotatable spindle upon which the cutter is mounted, means for rotating the spindle a predetermined distance in one direction when the cutter is out of contact with the grinding member to bring another tooth into position to be ground, and means for preventing backward rotation of said spindle.

13. A machine of the class described having, in combination, a grinding member, a support for a cutter, said support being movable to carry the cutter into and out of contact with the grinding member, and means constructed and arranged to maintain said support in a predetermined fixed position with the cutter in position to contact with the grinding member.

14. A machine of the class described having, in combination, a grinding member, an arm rotatably mounted adjacent to said member and having means for supporting a toothed cutter to carry it into and out of contact with the grinding member as the arm is rotated, and means for supporting said arm with the cutter in grinding position with respect to said member so as to permit movement of the cutter with respect to its support for grinding the teeth thereof independently of movement of said arm.

15. A machine of the class described having, in combination, a grinding member, an arm rotatably mounted adjacent to said member and having means for supporting a cutter to carry it into and out of contact with the grinding member as the arm is rotated, and means for supporting said arm with the cutter in grinding position with respect to said member, said means comprising an abutment on the frame of the machine and a pawl carried by said arm and arranged to engage said abutment to maintain the arm in a stationary position.

16. A machine of the class described having, in combination, a grinding member, a support for a toothed cutter, means whereby to move said support to bring the cutter into and out of contact with said grinding member, means for advancing the cutter angularly to present the teeth successively to said grinding member, and means for opposing further movement of said support when the last tooth of the series has been ground.

17. A machine of the class described having, in combination, a grinding member, a support for a toothed cutter, means whereby to revolve said support about an axis located at one side of the center of the grinding member to carry the cutter into and out of contact with the grinding member, means for rotating the cutter with respect to the support to present the teeth in succession to the action of the grinding member, and means for stopping the revolution of said support when the last tooth of the series has been ground.

18. A machine of the class described having, in combination, a support for a tothed cutter, means whereby to revolve said support to carry the cutter into and out of contact with the grinding member, means for rotating the cutter with respect to the support to present the teeth in succession to the action of the grinding member, a stop member on the frame of the machine, and means rotatable with said cutter and arranged to engage said stop member so as to oppose further movement of said support when the last tooth has been ground.

19. A machine of the class described having, in combination, a grinding member, and a member for supporting a cutter, said members having provision for relative movement initially to position the active face of the grinding member and the surface to be ground in opposed relation, and also for other movement to effect uniform relative approach of said face of the grinding member and the surface to be ground.

20. A machine of the class described having, in combination, a grinding member, a member for supporting a cutter, said members having provision for relative movement initially to position the active face of the grinding member and the surface to be ground in opposed relation, and means for effecting other relative movement of said members to bring the cutter and grinding member into firm effective engagement without altering the angular relation of the cutter to the face of the grinding member.

21. A machine of the class described having, in combination, a grinding member, a support for a cutter, said support being movable initially to bring the surface to be ground into opposed relation to the active face of the grinding member, and means for imparting other bodily movement to said support to cause the surface to be ground to move in a direction toward said opposed face of the grinding member.

22. A machine of the class described having, in combination, a grinding member, a support for a cutter, said support being movable to cause the surface to be ground to traverse the active face of the grinding member, and means for displacing said support laterally during said traversing movement to effect firm engagement between the grinding member and the surface to be ground.

23. A machine of the class described having, in combination, a grinding member, a support for a cutter, said support being movable to cause the surface to be ground to traverse the active face of the grinding member, and means for imparting other bodily movement to said support between the limits of said traverse to cause the surface to be ground to approach and recede from the face of the grinding member.

24. A machine of the class described having, in combination, a grinding member, a support for a toothed cutter, said support being movable to bring the cutter into operative relation to the grinding member with the latter projecting between adjacent teeth of the cutter, and automatic means for imparting other movement to said support to effect firm engagement between a tooth of the cutter and said grinding member without altering the angular relation of the cutter to the grinding member.

25. A machine of the class described having, in combination, a grinding member, a rotatable shaft, a support for a toothed cutter carried by said shaft and rotatable therewith to bring the cutter into operative relation to the grinding member with the latter projecting between adjacent teeth of the cutter, and means for effecting longitudinal movement of the shaft while the cutter and the grinding member are in said operative grinding relation to bring the surface of the tooth to be ground into firm engagement with the grinding member.

26. A machine of the class described having, in combination, a grinding member, a rotatable shaft, a support for a toothed cutter carried by said shaft and arranged to bring the cutter into operative relation to the grinding member with the latter projecting between adjacent teeth of the cutter, a stationary cam, and means carried by the shaft in position to engage said cam to effect longitudinal movement of the shaft while the cutter is in said operative grinding relation so as to bring the surface of the tooth to be ground into firm engagement with the grinding member.

27. A machine of the class described having, in combination, a grinding wheel, a support for a toothed cutter, said support being mounted for revoluble movement to bring the teeth of the cutter into grinding relation to the lateral face of the wheel, and means for guiding said support in its movement to prevent engagement of the cutting edges of the teeth with the peripheral surface of the wheel, said means comprising a fixed guide member and a member movable with the support and arranged to engage said fixed member.

28. A machine of the class described having, in combination, a grinding wheel, a rotatable shaft, a support for a toothed cutter carried by said shaft and arranged to bring the cutter, on rotation of the shaft, into operative relation to the grinding wheel with the surface of a tooth to be ground opposed to the face of said wheel, and means for controlling the movement of said support to prevent engagement of the cutting edge of the tooth with the peripheral surface of the wheel, said means comprising a fixed guide and means connected with the shaft and coöperating with said guide to control the longitudinal position of the shaft as the cutter approaches the wheel.

29. A machine of the class described having, in combination, a grinding member, a support for a toothed cutter, said support being movable to cause the surface of a tooth to be ground to traverse in one direction the active face of the grinding member and means for guiding said support in movement so as to prevent firm engagement of the surface to be ground with the grinding member at the beginning and end of a traverse of said tooth across the face of said member.

30. A machine of the class described having, in combination, a grinding member, a rotatable shaft, a support for a toothed cutter carried by said shaft and movable on rotation of the shaft to cause the surface of a tooth to be ground to traverse the face of the grinding member, and means for controlling said movement of the support comprising parallel guides and means connected with the shaft and arranged to travel between the guides to determine the longitudinal position of the shaft, said guides having an intermediate portion shaped to cause longitudinal movement of the shaft so as to bring the surface to be ground into firm engagement with the grinding member.

31. A machine of the class described having, in combination, a grinding member, a member for supporting a cutter, said members being relatively movable to position the surface of the cutter to be ground in opposed parallel relation to the face of the grinding member, and means for subsequently effecting relative movement of said members in a direction transverse to the path of said first named movement while maintaining said parallel relation between the grinding member and the surface to be ground.

32. A machine of the class described having, in combination, a support revoluble in a closed path and having provision for mounting a toothed cutter thereon in a plane transverse to the direction of movement of the support, and a grinding member arranged to project into the path of movement of the cutter a distance substantially equal to the radial depth of the teeth of the cutter.

In testimony whereof I have signed my name to this specification in the presence of two subscribing witnesses.

FREDERICK M. FURBER.

Witnesses:
CHESTER E. ROGERS,
RUTH E. WARD.